United States Patent [19]
Mochizuki

[11] Patent Number: 5,787,062
[45] Date of Patent: Jul. 28, 1998

[54] DISC-THICKNESS-AND-WARP DETECTING APPARATUS

[75] Inventor: Tsutomu Mochizuki, Chiba, Japan

[73] Assignee: Sony Corporation, Japan

[21] Appl. No.: 733,170

[22] Filed: Oct. 17, 1996

[30] Foreign Application Priority Data

Oct. 24, 1995 [JP] Japan .................. 7-299020

[51] Int. Cl.$^6$ ...................................... G11B 7/13
[52] U.S. Cl. .................. 369/58; 369/94; 369/44.26; 369/120
[58] Field of Search .................. 369/54, 58, 44.23, 369/44.14, 44.12, 44.26, 44.41, 44.42, 112, 94, 107, 124, 122, 120

[56] References Cited

U.S. PATENT DOCUMENTS

| 5,430,701 | 7/1995 | Ito et al. .................. 369/44.23 |
| 5,553,052 | 9/1996 | Oono et al. .................. 369/112 |
| 5,555,232 | 9/1996 | Kobayashi et al. .................. 369/112 |
| 5,621,717 | 4/1997 | Finkelstein et al. .................. 369/54 |

FOREIGN PATENT DOCUMENTS 7-262585  10/1995  Japan .

Primary Examiner—Tod R. Swann
Assistant Examiner—Kim-Kwok Chu
Attorney, Agent, or Firm—Ronald P. Kananen

[57] ABSTRACT

A disc-thickness-and-warp detecting apparatus includes a light source for emitting rays onto a peripheral portion of an optical disc; a photo-detector having a plurality of photo-detecting portions separated corresponding to the direction of tracks formed on the disc, for detecting rays emitted from the light source and reflected by the disc; an adding circuit for generating a sum-signal by adding the detection-signals from the respective photo-receiving portions; and a subtracting circuit for generating a difference-signal by performing the subtraction of the detection-signals from the respective photo-receiving portions. The apparatus uses such common detecting means to detect the distance between the disc surface and the signal-recording surface and a warp of the disc.

8 Claims, 8 Drawing Sheets

DISC-THICKNESS-AND-WARP DETECTING APPARATUS

BACKGROUND OF THE INVENTION

1. Field of the Invention

This invention relates to optical disc systems for compact discs and magneto-optical discs, and optical pickups thereof, and in particular to a disc-thickness-and-warp detecting apparatus capable of detecting the thicknesses and warps of plural types of optical discs.

2. Description of the Related Art

Figure 12:
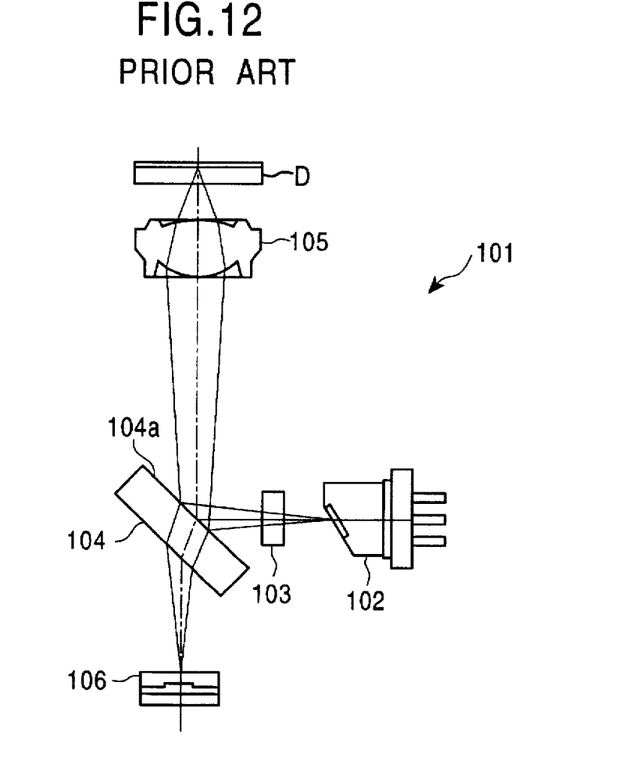
FIG. 12 is a schematic section view illustrating an example of a conventional optical pickup.

Conventionally, a reproducing optical pickup has a structure as shown in, for example, FIG. 12.

This optical pickup 101 includes a semiconductor laser device 102, a grating 103, a beam splitter 104, an object lens 105, and a photodetector 106.

In accordance with this optical pickup 101 shown in FIG. 12, a laser beam emitted from the semiconductor laser 102 is separated by the grating 103 into three beams of a beam having 0-th order and beams having ±1st orders, and the beams are reflected by the half-mirror surface 104a of the beam splitter 104. Subsequently, the three beams are converged through the object lens 105 to form an image at a point on the signal-recording surface of an optical disc D.

Beams returned from the signal-recording surface of the optical disc D are incident upon the beam splitter 104 through the object lens 105. The returned beams further pass through the half-mirror surface 104a of the beam splitter 104 to be incident upon the photodetector 106. Accordingly, the respective returned beams caused by the beams separated by the grating 103 are incident upon the corresponding photo-receiving portions of the photo-receiver 106. Thereby, signals from the optical disc D such as a read-out signal, a focussing-error signal and a tracking-error signal are generated based on detection signals from the respective photo-receiving portions. Based on this focussing-error signal and this tracking-error signal, a servo-mechanism (not shown) controls the operation of a biaxial actuator that supports the object lens 105, so that the object lens 105 moves for focussing (in the direction parallel to the optical axis of the object lens) and for tracking (in the direction along the radial direction of the optical disc).

In an optical disc system using the above-mentioned optical pickup, an optical disc to be used is based on a common standard, and its thickness (the distance between the optical disc surface and the signal-recording surface) is constant, thus, the thickness of the optical disc is not detected.

However, many types of formats for optical discs will be employed in the future. Accordingly, there is a possibility that optical discs having greatly different thicknesses are used.

When recording or reproducing is performed in respect to optical discs having different thicknesses, there is a problem in which the distance between an object lens and the signal-recording surface of each disc must be maintained at a constant value by an optical pickup including the object lens in accordance with the thickness of the disc.

In addition, optical discs have radial skew because they tend to warp in the radial direction. With regard to this point, for example, in connection with video discs and so forth a warp of the disc is detected by a warp-detector included in a system for such discs.

Figure 13:
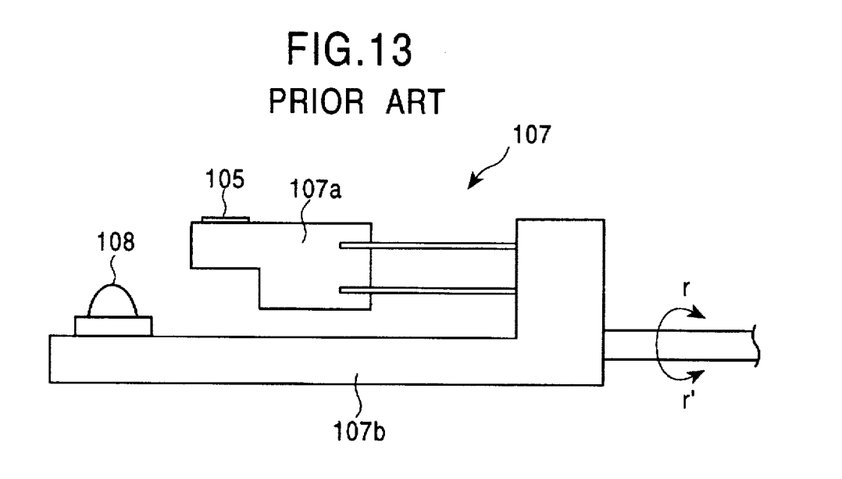
FIG. 13 is a schematic section view illustrating an example of a conventional optical pickup including a radial-skew detector.

As means for detecting skew in an optical disc, as shown in, for example, FIG. 13, there is a known optical pickup that includes a skew-detecting sensor 108 disposed on a biaxial base 107b that supports a supporting member 107a for supporting an object lens 105 in a biaxial actuator 107 for moving the object lens 105 in the focussing direction and the tracking direction so that the supporting member 107a moves in the focussing direction and the tracking direction. In this pickup the biaxial base 107b of the biaxial actuator 107 is turned for adjustment in accordance with a skew angle detected by the skew-detecting sensor 108 so that the skew angle is controlled to zero as shown by arrows r and r'. The skew-detecting sensor 108 is shown in, for example, Japanese Unexamined Patent Publication No. 7-262585 (Japanese Patent Application No. 6-47408).

However, the above-mentioned skew-detecting sensor 108 in such a warp-detector does not detect the thickness of the optical disc. Therefore, it is inevitable that an optical pickup or an optical disc system that includes a disc-thickness detecting apparatus needs a plurality of detecting means. Thus, such an optical pickup or an optical disc system has a problem of raised costs for parts and assembly caused by an increased number of parts, and becomes large-sized due to a complicated structure formed by the parts.

SUMMARY OF THE INVENTION

Accordingly, it is an object of the present invention to provide a disc-thickness-and-warp detecting apparatus, having a simplified structure, for detecting the thicknesses and warps of different types of optical discs, an optical pickup thereof, and an optical disc system.

In accordance with an aspect of the present invention, the foregoing object is achieved through the provision of a disc-thickness-and-warp detecting apparatus including: a light source for emitting rays onto a peripheral portion of an optical disc; a photo-detector having a plurality of photo-detecting portions separated corresponding to the direction of tracks formed on the disc, for detecting the rays emitted from the light source, reflected by the disc; an adding circuit for generating a sum-signal by adding the detection-signals from the respective photo-receiving portions; and a subtracting circuit for generating a difference-signal by performing the subtraction of the detection-signals from the respective photo-receiving portions.

The light source and the photo-detector may be formed on a single board.

The light source and the photo-detector may be arranged on the board along the direction of a tangent to the optical disc, and the photo-detecting portions of the photo-detector may be separated by a parting line formed by a parallel line to the tangent.

The photo-detector, which projects in the direction of the tangent to the optical disc, may include at least one different photo-receiving portion.

The disc-thickness-and-warp detecting apparatus may include a second subtracting circuit for subtracting the detection-signal from the different photo-receiving portion from the sum-signal generated by the adding circuit.

In accordance with another aspect of the present invention, the foregoing object is achieved through the provision of an optical pickup apparatus including: beam-emitting means for emitting laser light onto an optical disc; an object lens for converging the laser beam from the beam-emitting means onto the disc; an actuator for supporting the object lens so as to move the same in the focussing direction and the tracking direction; detecting means for detecting light returned from the disc; a light source for emitting rays onto a peripheral portion of the disc; a photo-detector having a plurality of photo-detecting portions separated corresponding to the direction of tracks formed on the disc, for detecting rays emitted from the light source, reflected by the disc; an adding circuit for generating a sum-signal by adding the detection-signals from the respective photo-receiving portions; and a subtracting circuit for generating a difference-signal by performing the subtraction of the detection-signals from the respective photo-receiving portions.

The light source and the photo-detector may be formed on a single board.

The light source and the photo-detector may be arranged on the board along the direction of a tangent to the optical disc, and the photo-detecting portions of the photo-detector may be separated by a parting line formed by a parallel line to the tangent.

The photo-detector, which projects in the direction of the tangent to the optical disc, may include at least one different photo-receiving portion, and the disc-thickness-and-warp detecting apparatus may include a second subtracting circuit for subtracting the detection-signal from the different photo-receiving portion from the sum-signal generated by the adding circuit.

In accordance of a further aspect of the present invention, the foregoing object is achieved through the provision of an optical disc recording and/or reproducing system including: driving means for rotating an optical disc; an optical pickup apparatus for emitting rays through an object lens onto the rotating disc and for using photo-detecting means to detect rays returned from the signal-recording surface of the disc through the object lens; a signal processing circuit for generating a reproduction signal from the disc, based on a detection signal from the detecting means; a servo-circuit for moving the object lens of the pickup apparatus in the focussing direction and the tracking direction, based on the signal from the photo-detecting means; a light source for emitting rays onto a peripheral portion of the disc; a photo-detector having a plurality of photo-detecting portions separated corresponding to the direction of tracks formed on the disc, for detecting rays emitted from the light source and reflected by the disc; a subtracting circuit for generating a difference-signal by performing the subtraction of the detection-signals from the respective photo-receiving portions; and an adding circuit for generating a sum-signal by adding the detection-signals from the respective photo-receiving portions, and wherein the optical disc recording and/or reproducing system changes the relative distance between the disc and the object lens, based on the output of the adding circuit.

The light source and the photo-detector may be formed on a single board.

The light source and the photo-detector may be arranged on the board along the direction of a tangent to the optical disc, and the photo-detecting portions of the photo-detector may be separated by a parting line formed by a parallel line to the tangent.

The photo-detector, which projects in the direction of the tangent to the optical disc, may include at least one different photo-receiving portion, and the optical disc recording and/or reproducing system may include a second subtracting circuit for subtracting the detection-signal from the different photo-receiving portion from the sum-signal generated by the adding circuit.

DESCRIPTION OF THE PREFERRED EMBODIMENTS

By referring to FIGS. 1 to 11, preferred embodiments of the present invention will be described below.

These embodiments are detailed and preferred examples of the present invention, and therefore they are provided with technically preferred, various limitations. However, the scope of the present invention is not limited to these embodiments unless the following explanation includes a particular description to limit the present invention.

Figure 11:
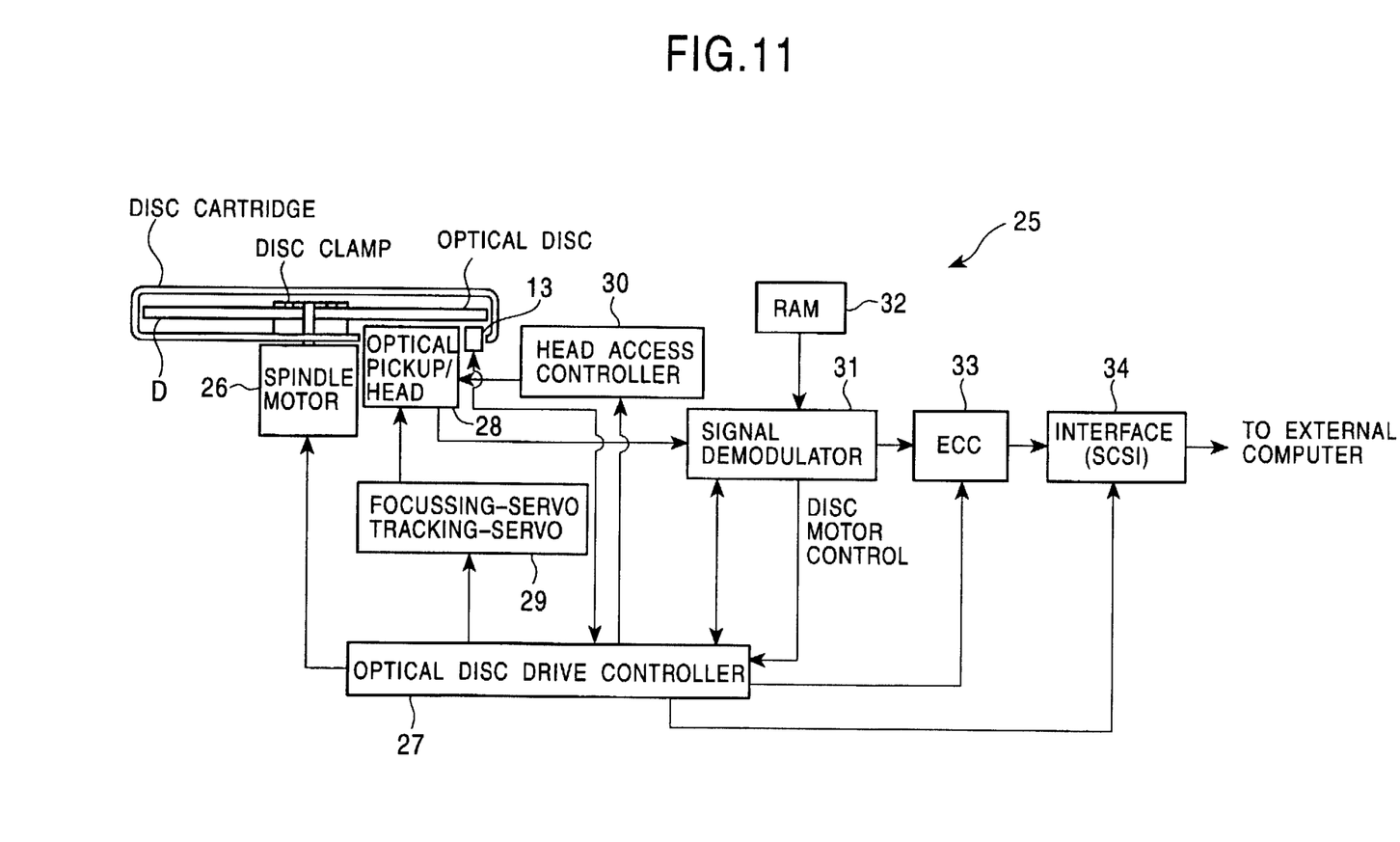
FIG. 11 is a block diagram showing an optical disc system according to a preferred embodiment of the present invention.

FIG. 11 shows a block diagram corresponding to an optical disc system according to a preferred embodiment of the present invention.

This optical disc system 25 includes a spindle motor 26 serving as driving means for rotating an optical disc D. This spindle motor 26 is controlled to rotate at a predetermined revolution by an optical disc drive controller 27.

An optical pickup/head 28 emits rays to record a signal onto the signal-recording surface of the rotating optical disc D. This optical pickup/head 28 also outputs a reproducing signal, based on returned rays from the signal-recording surface, to a signal demodulator 31 in order to detect returned rays reflected by the signal-recording surface. The detailed structure of the optical pickup/head 28 will be mentioned below.

A recorded signal demodulated by the signal demodulator 31 is sent to an error corrector 33, in which errors in the recorded signal are corrected. The corrected signal is sent to an external computer or the like through an interface 34. This arrangement enables the external computer or the like to receive the recorded signal on the optical disc D as a reproduced signal.

The optical pickup/head 28 is connected to, for example, a head access controller 30 for moving the optical pickup/head 28 to a predetermined recording track by jumping over tracks. The optical pickup/head 28 is also connected to a servo-circuit 29 for moving an object lens of the pickup 28 in the focussing direction and the tracking direction, with respect to a biaxial actuator supporting the object lens, at the predetermined position to which the pickup/head 28 is moved.

Figure 1:
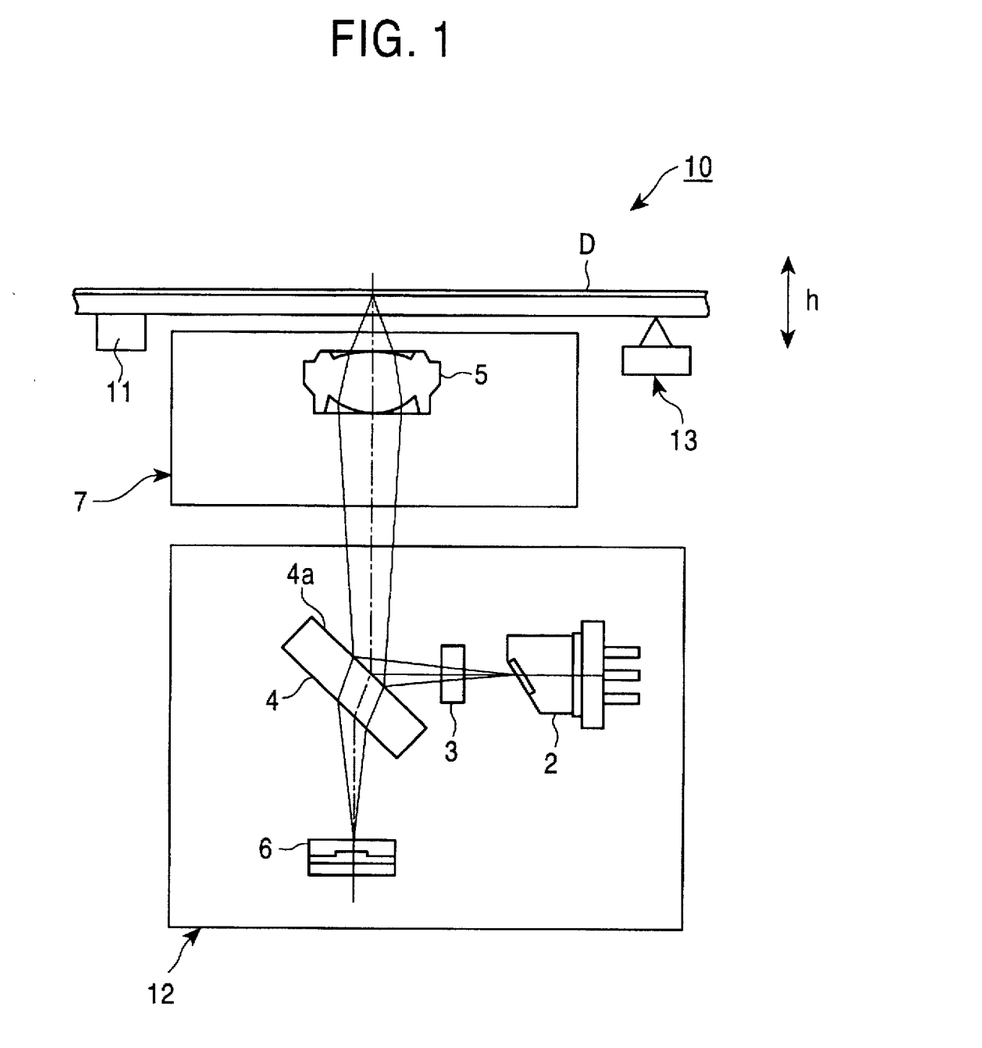
FIG. 1 is a schematic view chiefly illustrating an optical disc system including a disc-thickness-and-warp detecting apparatus according to an embodiment of the present invention.

FIG. 1 shows an optical disc system including a disc-thickness-and-warp detecting apparatus according to an embodiment of the present invention.

This optical disc system 10 includes a spindle motor 11 for rotating an optical disc D, an optical pickup 12 for reading out information recorded on the signal-recording surface of the disc D, and the disc-thickness-and-warp detecting apparatus 13.

The disc-thickness-and-warp detecting apparatus 13 sends detected output to an optical disc drive controller 27 as shown in, for example, FIG. 11.

The optical pickup 12 includes a semiconductor laser device 2, a grating 3, a beam splitter 4, an object lens 5, and a photo-receiver 6, similar to the conventional optical pickup shown in FIG. 12.

This object lens 5 is supported by a biaxial actuator 7 so as to move in two directions perpendicular to each other, namely, the tracking direction and the focussing direction.

In this arrangement a laser beam emitted from the semiconductor laser device 2 is separated by the grating 3 into three light beams of a beam having 0-th order and beams having ±1st orders, and the separated beams are reflected by the half-mirror surface 4a of the beam splitter 4. Subsequently, the reflected beams are converged through the object lens 5 to form an image at a point on the signal-recording surface of the optical disc D.

Beams returned from the signal-recording surface of the optical disc D pass through the object lens 5 again to be incident upon the beam splitter 4. The returned beams further pass through the half-mirror surface 4a of the beam splitter 4 to be incident upon the photodetector 6. Accordingly, the respective returned beams caused by the beams separated by the grating 3 are incident upon the corresponding photo-receiving portions of the photo-receiver 6. Thereby, signals from the optical disc D such as a read-out signal, a focussing-error signal and a tracking-error signal are generated based on detection signals from the respective photo-receiving portions. Based on this focussing-error signal and this tracking-error signal, a servo-circuit 29 shown in FIG. 11 controls the operation of a biaxial actuator 7 that supports the object lens 5, so that the object lens 5 moves for focussing and for tracking.

Figure 2A:
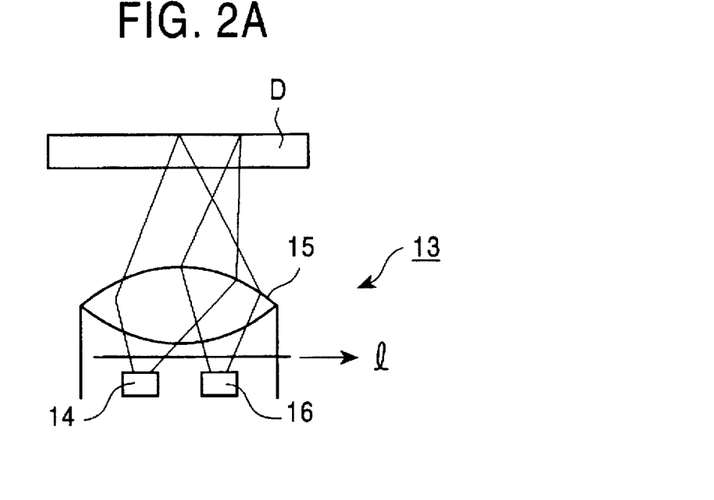
FIGS. 2A and 2B are a detailed side view and a detailed plan view illustrating the disc-thickness-and-warp detecting apparatus included in the optical disc system shown in FIG. 1.
Figure 2B:
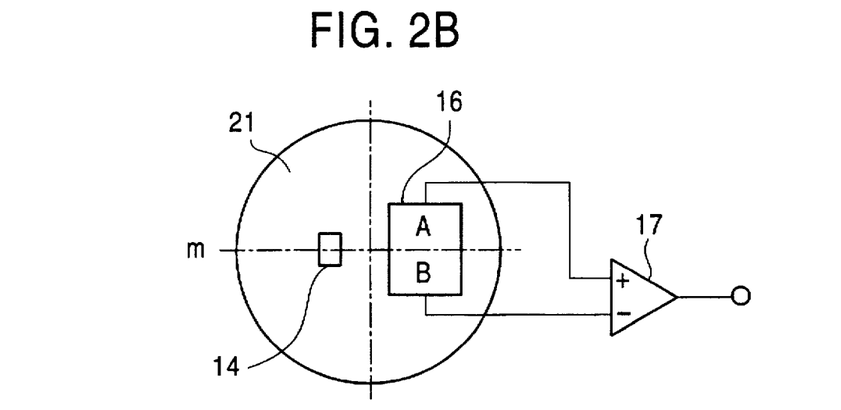

FIGS. 2A and 2B show the structure of the disc-thickness-and-warp detecting apparatus included in the optical disc system 10 shown in FIG. 1.

The disc-thickness-and-warp detecting apparatus 13 includes a ray emitter 14 for emitting rays onto a peripheral portion on the signal-recording surface of the optical disc D, a converging lens 15 for converging the rays from the ray emitter 14, and a photo-receiver 16 for receiving rays reflected by the signal-receiving surface of the optical disc D through the converging lens 15.

This ray emitter 14 and this photo-receiver 16 are arranged tangential to the optical disc D as denoted by an arrow 1. The ray emitter 14 and the photo-receiver 16 shown in FIG. 2B are formed so as to be incorporated on a single board 21. This arrangement omits the mutual alignment between the ray emitter 14 and the photo-receiver 16.

The photo-receiver 16 has a plurality of photo-receiving surfaces A and B (two photo-receiving surfaces shown in FIG. 2B) along a parting line m extending tangential to the optical disc D.

The converging lens 15 is disposed so that rays from the ray emitter 14 are not converged to form an image onto the signal-recording surface of the optical disc D. Therefore, the rays from the ray emitter 14 are converged onto the signal-recording surface of the optical disc D through the converging lens 15, and the converging rays are reflected by the signal-recording surface without a converged image formed. The reflected rays pass through the converging lens 15 to form a spot L on the photo-receiving surfaces A and B of the photo-receiver 16 as shown in FIG. 4.

Figure 3:
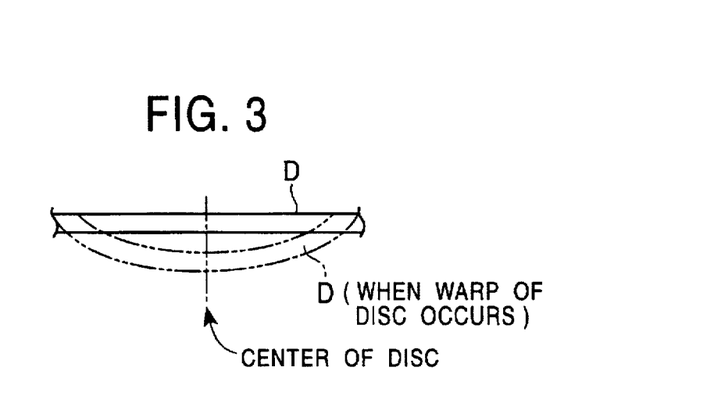
FIG. 3 is a side view illustrating a warp of an optical disc to be detected by the disc-thickness-and-warp detecting apparatus shown in FIG. 2.
Figure 4:
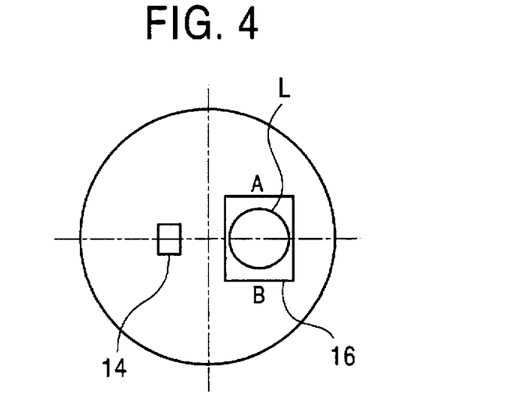
FIG. 4 is a plan view illustrating a spot formed on a photo-receiver when a warp of the optical disc is not detected by the disc-thickness-and-warp detecting apparatus shown in FIG. 2.

When the optical disc D has no warp as denoted by solid lines in FIG. 3, the center of the spot L is located on the parting line of the photo-receiving surfaces A and B in the photo-receiver 16 as shown in FIG. 4. Accordingly, the photo-receiving surfaces A and B receive the same quantities of light to generate equal output signals.

Figure 5:
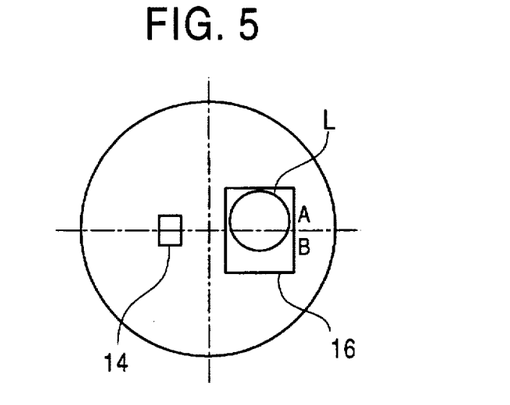
FIG. 5 is a plan view illustrating a spot formed on the photo-receiver when radial skew caused by a warp of the optical disc is detected by the disc-thickness-and-warp detecting apparatus shown in FIG. 2.
Figure 6:
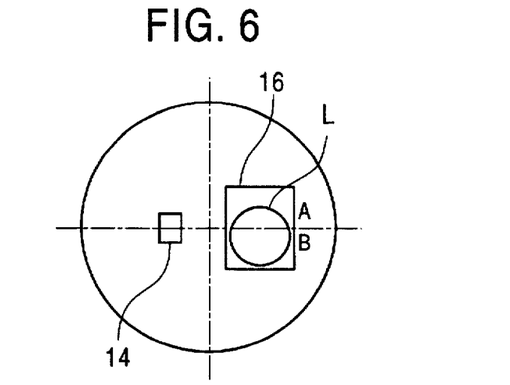
FIG. 6 is a plan view illustrating a spot formed on the photo-receiver when opposite-direction radial skew caused by a warp of the optical disc is detected by the disc-thickness-and-warp detecting apparatus shown in FIG. 2.

To the contrary, when a warp of the optical disc D occurs as denoted by dashed lines in FIG. 3, the spot L is shifted from the parting line of the photo-receiving surfaces A and B of the photo-receiver 16, due to radial skew of the disc D, as shown in FIG. 5 or 6. Consequently, the photo-receiving surfaces A and B receive different quantities of light, so that a difference occurs between their output signals.

As shown in FIG. 2B, by processing detection signals SA and SB from the respective photo-receiving surfaces A and B of the photo-receiver 16 with a subtracting circuit 17 for subtracting the signal SB from the signal SA to find a difference-signal (SA-SB), a warp of the optical disc D can be detected when the difference-signal is not zero.

Further, the detection of two types of optical discs which have different thicknesses (the distances between the optical disc surfaces and the signal-recording surfaces) will be described below.

Figure 7A:
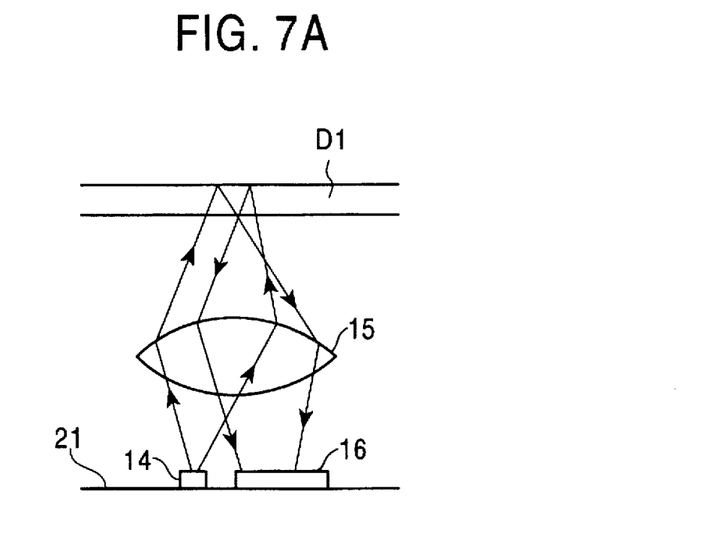
FIGS. 7A and 7B are a side view and a plan view illustrating an optical disc having a relatively small thickness detected by the disc-thickness-and-warp detecting apparatus shown in FIG. 2.
Figure 7B:
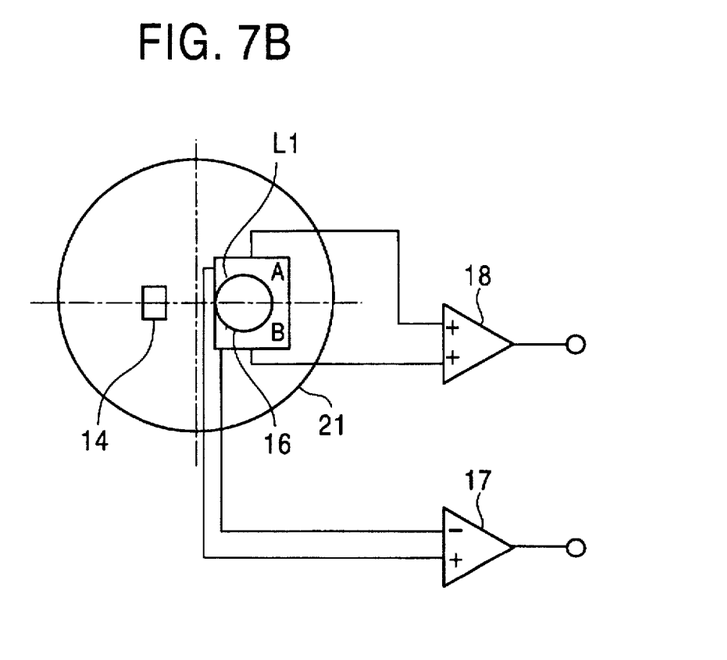

When an optical disc D1 has a relatively small thickness as shown in FIG. 7A, the distance between the converging lens 15 and the signal-recording surface of the disc D1 shortens. Thus, a spot L1 formed on the respective photo-receiving surfaces A and B of the photo-receiver 16 becomes relatively large as shown in FIG. 7B.

Figure 8A:
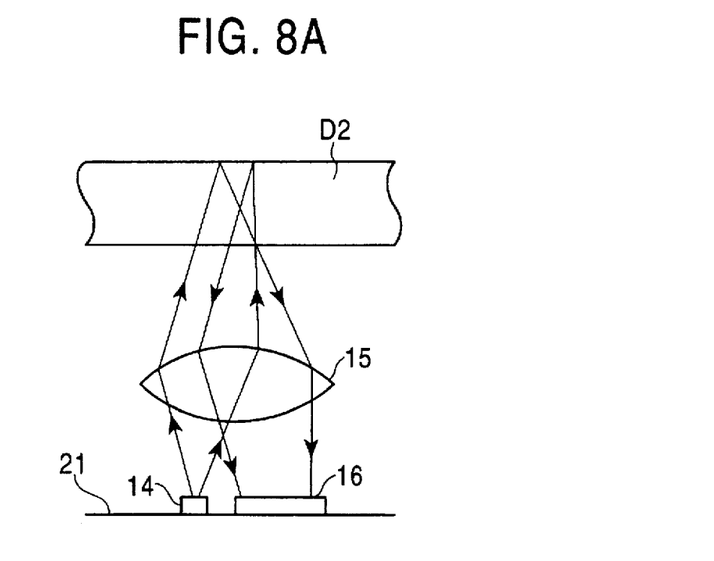
FIGS. 8A and 8B are a side view and a plan view illustrating an optical disc having a relatively large thickness detected by the disc-thickness-and-warp detecting apparatus shown in FIG. 2.
Figure 8B:
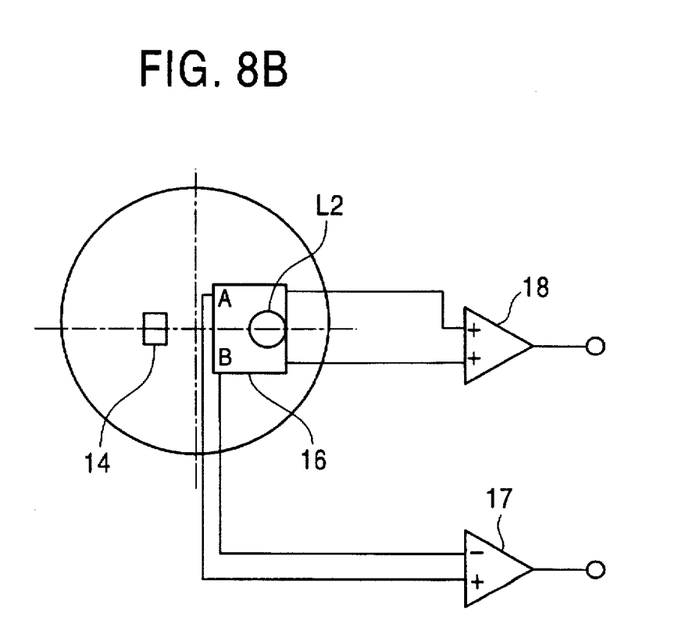

To the contrary, when an optical disc D2 has a relatively large thickness as shown in FIG. 8A, the distance between the converging lens 15 and the signal-recording surface of the disc D2 lengthens. Thus, a spot L2 formed on the respective photo-receiving surfaces A and B of the photo-receiver 16 becomes smaller than the spot L1.

In this embodiment, for example, the spot L1 formed when the thickness of the optical disc D is small as denoted by D1 is used as a standard.

Consequently, as shown in FIGS. 7A, 7B, 8A and 8B, by processing the detection signals SA and SB from the respective photo-receiving surfaces A and B of the photo-receiver 16 with an adding circuit 18 for adding the signals SA and SB to find a sum-signal (SA+SB), detection of whether the thin optical disc D1 or the thick optical disc D2 is being used can be performed based on the magnitude of this sum-signal. The result of this detection is sent to the optical disc controller 27.

Based on the result of detecting the disc thickness, moving means (not shown) is controlled by the optical disc controller 27, for example, only the biaxial actuator 7 of the optical pickup 13 in the optical disc system 10 or the whole optical pickup 13 is moved with respect to the optical disc D, or the disc itself is upwardly or downwardly moved in the direction denoted by the arrow h as shown in FIG. 1, and thereby the pickup 13 is located at an appropriate position with respect to the signal-recording surface of the disc D1 or D2. In this manner the optical disc system performs recording to or reproducing from all types of optical discs which have different thicknesses, regardless of such thicknesses.

Figure 9A:
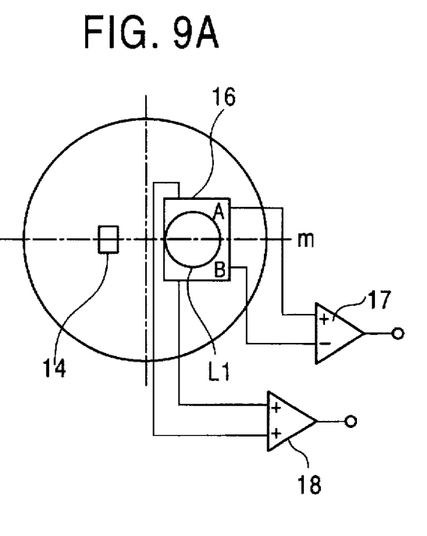
FIGS. 9A and 9B are plan views illustrating optical discs having different thicknesses detected by a modification of the disc-thickness-and-warp detecting apparatus shown in FIG. 2.
Figure 9B:
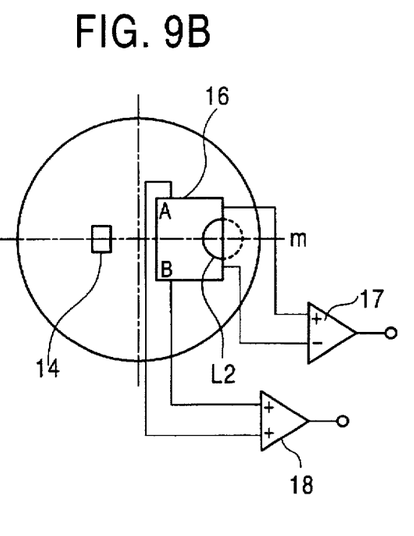

FIGS. 9A and 9B show a modification of the disc-thickness-and-warp detecting apparatus 13 when detecting the thickness of the optical disc D1 and when detecting the thickness of the optical disc D2. In this modification the detecting apparatus 13 uses the magnitude of a shift in reflected light from the photo-receiver 16, caused by a difference in the distance between the photo-receiver 16 and the thin disc D1 and the distance between the photo-receiver 16 and the thick disc D2.

The photo-receiver 16 is arranged so as to receive the whole spot L1 caused by the reflected light with respect to the thin optical disc D1 and so that the spot L2 caused by the reflected light is shifted from the photo-receiving surfaces A and B of the photo-receiver 16 with respect to the thick optical disc D2. This shift of the spot L2 from the photo-receiving surfaces A and B occurs because in the thick disc D2 the distance between the ray emitter 14 and the signal-recording surfaces A, B and the distance between the signal-recording surfaces A, B and the photo-receiver 16 are greater than in the thin disc D1, and as a result, the reflected light from the disc D2 is greatly shifted.

In accordance with this arrangement, when the thin optical disc D1 is used, the spot L1 caused by the reflected light is located completely in the photo-receiving surfaces A and B as shown in FIG. 9A, while, when the thick optical disc D2 is used, the spot L2 caused by the reflected light is smaller than the spot L1 and is shifted on the right of the photo-receiving surfaces A and B as shown in FIG. 9B.

Consequently, the difference between the sum-signal of the output signals from the respective photo-receiving surfaces A and B of the photo-receiver 16 with respect to the thin optical disc D1 and the sum signal with respect to the thick optical disc D2 is increasingly enhanced. Thereby, accurate detection of whether the thin disc D1 or the thick disc D2 is being used is performed.

Figure 10A:
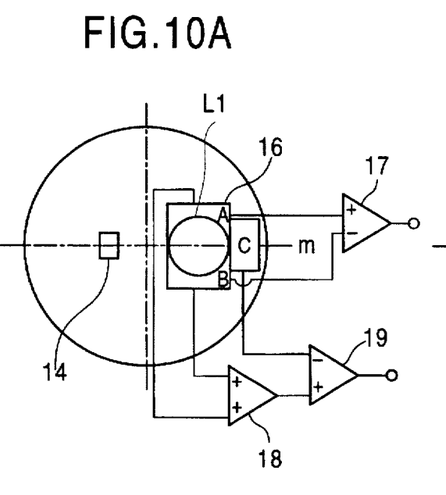
FIGS. 10A and 10B are plan views illustrating optical discs having different thicknesses detected by a second modification of the disc-thickness-and-warp detecting apparatus shown in FIG. 2.
Figure 10B:
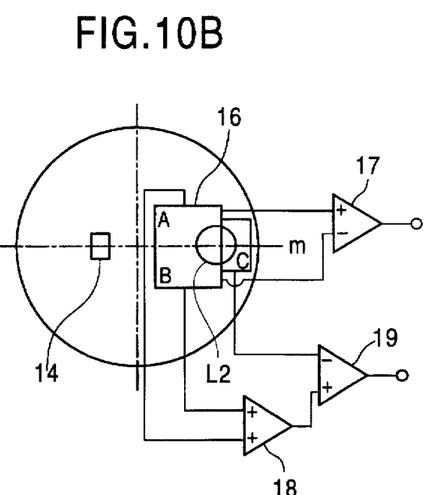

FIGS. 10A and 10B show a modification of the disc-thickness-and-warp detecting apparatus 13 when detecting the thickness of the optical disc D1 and when detecting the thickness of the optical disc D2.

The photo-receiver 16 is arranged so as to receive the whole spot L1 caused by the reflected light with respect to the thin optical disc D1 and so that the spot L2 caused by reflected light is shifted from the photo-receiving surfaces A and B of the photo-receiver 16 with respect to the thick optical disc D2. The photo-receiver 16 also includes a third photo-receiving surface C adjacent to the two photo-receiving surfaces A and B and on the extension of their parting line.

In accordance with this arrangement, when the thin optical disc D1 is used, the spot L1 caused by the reflected light is located completely in the photo-receiving surfaces A and B as shown in FIG. 10A, while, when the thick optical disc D2 is used, the spot L2 caused by the reflected light is smaller than the spot L1, and is shifted on the right of the photo-receiving surfaces A and B as shown in FIG. 10B.

Consequently, by using the adding circuit 18 to add the output signals from the two photo-receiving surfaces A and B, and by using the subtracting circuit 19 to subtract the output signal of the photo-receiving surface C from the output signal of the adding circuit 18, the difference between the sum-signal of the output signals from the respective photo-receiving surfaces A and B of the photo-receiver 16 with respect to the thin optical disc D1 and the sum-signal with respect to the thick optical disc D2 is increasingly enhanced. Thereby, detection of whether the thin disc D1 or the thick disc D2 is being used is readily, accurately performed.

In the above-mentioned embodiments the photo-receiver 16 is separated into the two photo-receiving surfaces A and B by the parting line m extending tangential to the optical disc D. However it is not limited to be separated into two, and may be separated into the greater number of photo-receiving surfaces. In such a case, by mutually comparing the output signals from the respective photo-receiving surfaces, a warp of the optical disc D can be detected in a plurality of stages.

The photo-receiving surface 16 also includes one photo-receiving surface C on the extension of the parting line m. However it is not limited thereto, and may include a plurality of photo-receiving surfaces arranged along the parting line m. In such a case, by mutually comparing the output signals from the respective photo-receiving surfaces, warps of a plurality of types of optical discs can be detected.

In the above embodiments the disc-thickness-and-warp detectors included in the optical disc apparatuses have been described. However, the disc-thickness-and-warp detecting apparatus is not limited to the foregoing, and may be disposed in a securing portion of the optical pickup. In addition, it is obvious that the disc-thickness-and-warp detecting apparatus formed as a single unit may be mounted on the optical disc system or the optical pickup.

What is claimed is:

1. An optical pickup apparatus including:

beam-emitting means for emitting laser light onto an optical disc;

an object lens for converging said laser beam from said beam-emitting means onto said disc;

an actuator for supporting said object lens so as to move the same in the focussing direction and the tracking direction;

detecting means for detecting light returned from said disc; and means for disc-thickness-and-warp detecting, said detecting means comprising
 a light source for emitting rays onto a peripheral portion of said disc;
 a photo-detector having a plurality of photo-detecting portions separated corresponding to the direction of tracks formed on said disc, for detecting the rays emitted from said light source, reflected by said disc;

an adding circuit for generating a sum-signal by adding the detection-signals from the respective photo-receiving portions of said photo-detector; and a subtracting circuit for generating a difference-signal by performing the subtraction of the detection-signals from the respective photo-receiving portions of said photo-detector.

2. An optical pickup apparatus according to claim 1, wherein said light source and said photo-detector are formed on a single board.

3. An optical pickup apparatus according to claim 2, wherein said light source and said photo-detector are arranged on said board along the direction of a tangent to said optical disc, and the photo-detecting portion of said photo-detector is separated by a parting line formed by a parallel line to said tangent.

4. An optical pickup apparatus according to claim 1, wherein said photo-detector further projects in the direction of a tangent to said optical disc, and includes at least one different photo-receiving portion, and wherein said optical pickup apparatus includes a second subtracting circuit for subtracting the detection signal from said different photo-receiving portion from said sum-signal generated by said adding circuit.

5. An optical disc recording and/or reproducing system including:

driving means for rotating an optical disc;

an optical pickup apparatus for emitting rays through an object lens onto said rotating disc and for using photodetecting means to detect rays returned from the signal-recording surface of said disc through said object lens;

a signal processing circuit for generating a reproduction signal from said disc, based on a detection signal from said detecting means;

a servo-circuit for moving said object lens of said pickup apparatus in the focussing direction and the tracking direction, based on said signal from said photo-detecting means; and means for disc-thickness-and-warp detecting, said detecting means comprising a light source for emitting rays onto a peripheral portion of said disc;

a photo-detector having a plurality of photo-detecting portions separated corresponding to the direction of tracks formed on said disc, for detecting the rays emitted from said light source, reflected by said disc;

a subtracting circuit for generating a difference-signal by performing the subtraction of the detection-signals from the respective photo-receiving portions of said photo-detector; and an adding circuit for generating a sum-signal by adding the detection-signals from the respective photo-receiving portions of said photo-detector, and wherein said optical disc recording and/or reproducing system changes the relative distance between said disc and said object lens, based on the output of said adding circuit.

6. An optical disc recording and/or reproducing system according to claim 5, wherein said light source and said photo-detector are formed on a single board.

7. An optical disc recording and/or reproducing system according to claim 6, wherein said light source and said photo-detector are arranged on said board along the direction of a tangent to said optical disc, and the photo-detecting portion of said photo-detector is separated by a parting line formed by a parallel line to said tangent.

8. An optical disc recording and/or reproducing system according to claim 1, wherein said photo-detector further projects in the direction of said tangent to said optical disc, and includes at least one different photo-receiving portion, and wherein said optical disc recording and/or reproducing system includes a second subtracting circuit for subtracting the detection-signal from said different photo-receiving portion from said sum-signal generated by said adding circuit.

* * * * *